Nov. 29, 1927. 1,650,894
W. KOEHLER
PROCESS FOR THE PRODUCTION OF MAGNESIUM FROM DOLOMITE
Filed Feb. 8, 1926 2 Sheets-Sheet 1
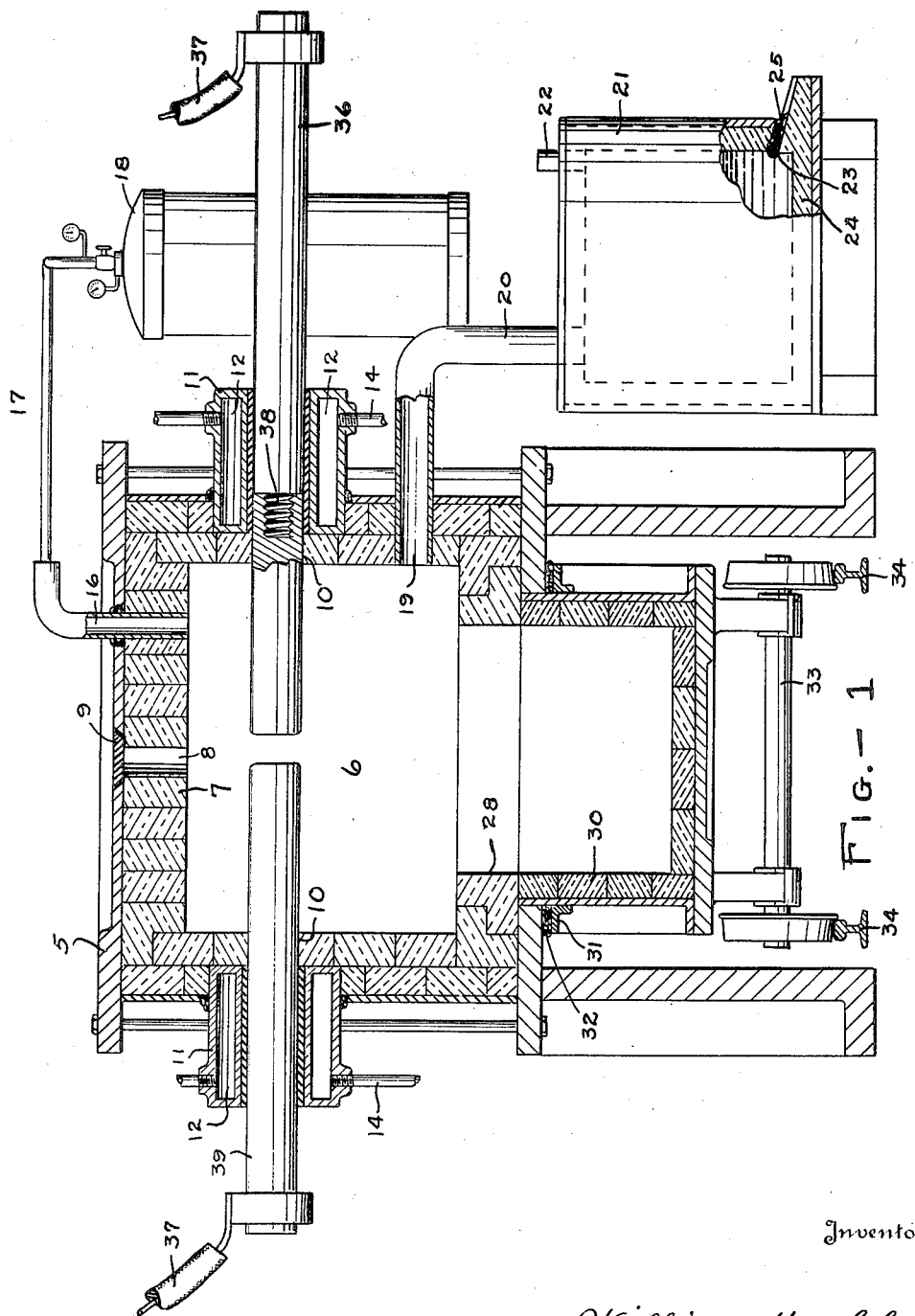
Inventor
William Koehler
Albert E. Lynch
Attorney
By

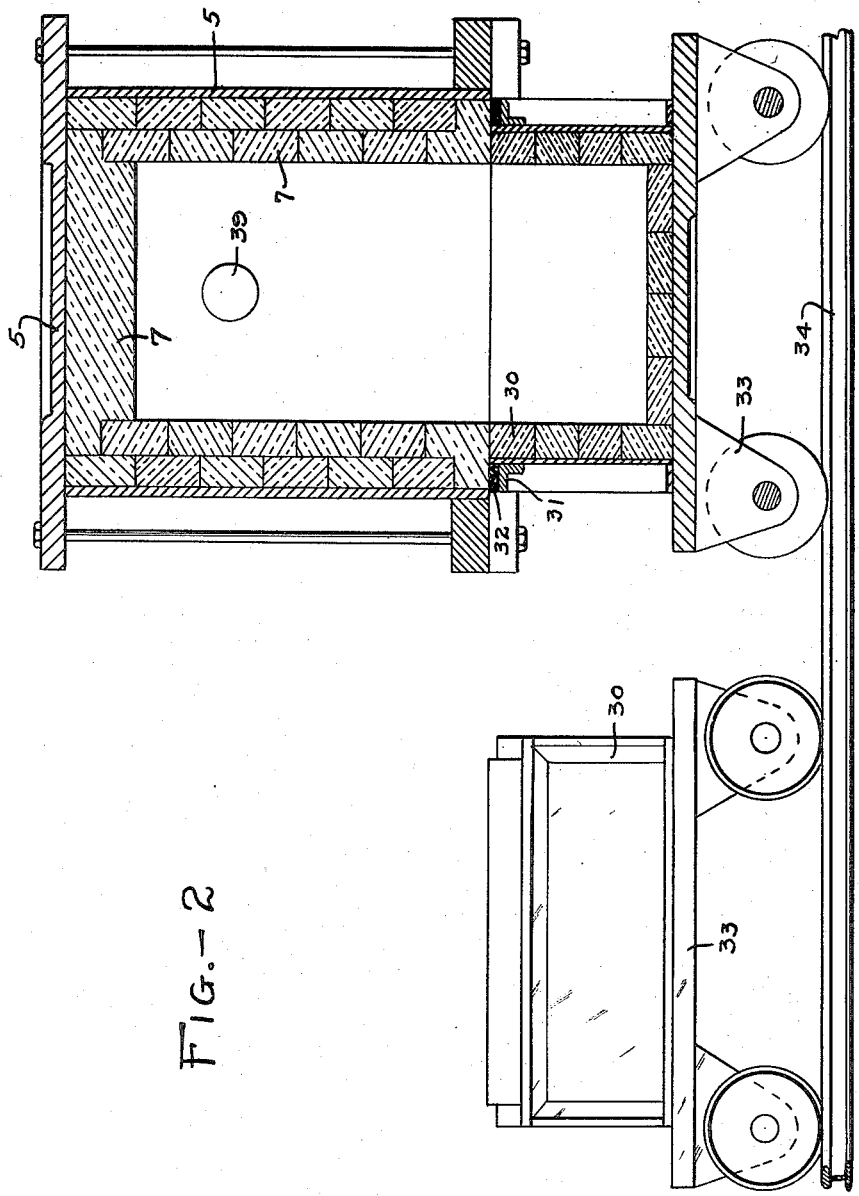

Patented Nov. 29, 1927.

1,650,894

UNITED STATES PATENT OFFICE.

WILLIAM KOEHLER, OF CLEVELAND, OHIO.

PROCESS FOR THE PRODUCTION OF MAGNESIUM FROM DOLOMITE.

Application filed February 8, 1926. Serial No. 86,757.

This invention relates to a new and improved process for the production of a metal and a carbide from ores or minerals and more particularly to a process for the production of metallic magnesium and calcium carbide from dolomite or other magnesia lime containing material.

The object of the invention is to provide a simple and economical process for the production of metallic magnesium free from halogens with calcium carbide as a by-product, and is a special process for obtaining magnesium as distinguished from the general process set forth in my pending application Serial No. 84,104.

A further object of the invention is to provide a process for the reduction of a charge containing magnesium and calcium compounds with the production of metallic magnesium and of calcium carbide.

In carrying out my process a quantity of dolomite is first reduced to a comminuted condition. The comminuted dolomite is then preferably purified by treating it with a fluoride and heating to drive out the silicon and other impurities through volatilization.

A quantity of a carbonaceous material for example, coke, coal, etc., is then reduced to a comminuted condition and is intimately mixed with the purified comminuted dolomite. A suitable binder material, such as tar, is then added to the mixed dolomite and carbonaceous material, and the magnesia lime carbon product thus obtained is preferably pressed or otherwise shaped into forms, such as bars, rod or lumps.

The bars, rods or other forms of the magnesia lime carbon product are then baked at a sufficiently high temperature to carbonize the binder material and impart such a degree of firmness to the forms as will permit said forms being handled without danger of breaking.

The magnesia lime carbon product after being shaped into the particular form desired and baked is then subjected to the action of intense heat and electricity in a current of a highly reducing atmosphere, resulting in the production of magnesium, calcium carbide, carbon monoxide, carbon dioxide, and other products of decomposition, the volatile and gaseous products being carried off by the current of reducing atmosphere.

In carrying out my process the magnesia lime carbon product may be used as a conducting mass in a high frequency induction furnace, or in the form of rods or bars may be included as a resistor in an electric circuit, or the forms may be fed into a heated zone produced by an electric current, or may be fed into an arc produced at the poles of an electric furnace. When employing the last mentioned method, the arc may be produced between a carbon electrode and an electrode formed of the magnesia lime carbon product or between two magnesia lime carbon product electrodes. The arc may also be produced between two carbon electrodes and the magnesia lime carbon product fed into the arc.

Referring to the accompanying drawings, Fig. 1 is a view mostly in cross section of a form of apparatus suitable for carrying out my process; Fig. 2 is a view of the same mostly in longitudinal section.

Again referring to the drawings 5 represents any suitable enclosure or casing providing a chamber 6. The dimensions of the chamber 6 theoretically, are immaterial but for practical commercial use it is advisable to construct the casing or enclosure on a relatively confined scale and therefore the casing or enclosure may be built similar to the body of an electric furnace of the customary type and I will therefore refer to said casing or enclosure as a furnace.

The furnace casing 5 is preferably lined in the usual manner with a refractory or other heat resisting material 7, capable of withstanding a high temperature and which cannot be reduced or acted upon by the liberated and volatilized magnesium vapors. The chamber 6 is preferably provided with a safety vent 8, which may be sealed by a plug 9.

At the opposite ends of the casing or furnace 5 are formed openings 10, in line with each other. On the outside of the furnace casing, around these openings are mounted stuffing boxes 11, which may be made of carbon, tungsten, or some other suitable material, having an extremely high melting point. These stuffing boxes 11 are shown provided with passageways 12 for circulating any suitable cooling medium, supplied by the pipes 14. The top of the furnace is provided with an inlet connection 16, and a pipe 17 extends from this inlet connection to a container 18, holding a hydrocarbon, hydrogen or other suitable reducing agent or medium.

In the lower part of the furnace is an outlet 19 which is connected by a conduit 20 with a suitable receptacle 21. The receptacle 21 is provided at its top with an open vent or outlet 22 and at its bottom with a drain opening 23. The receptacle 21 is preferably lined with a suitable refractory material 24 and the drain opening 23 is provided with a plug 25 of similar material.

In the bottom of the furnace is provided a large opening 28 and below said opening is arranged a receptacle 30, the rim of which registers with the said opening 28. The receptacle 30 is preferably provided near its top with a flange 31 for receiving any suitable material for forming a seal between the said receptacle and the bottom of the furnace. The receptacle 30 may be supported on a truck 33 adapted to travel on rails or other suitable supports 34 in order that the said receptacle may be readily removed when desired.

In carrying out my process with the furnace and apparatus just described the magnesia lime carbon product in the form of a rod or electrode 36 is inserted through the stuffing box at one end of the furnace, and the outer end thereof is connected to one terminal of an electric circuit 37. The bars 36 may be provided with any suitable means for connecting them together, such as a screw threaded connection shown at 38, so that the said bars can be continuously fed into the furnace without any interruption of the process. A carbon electrode or any other suitable electrode shown at 39 is inserted through the stuffing box at the other end of the furnace and its outer end is connected with the other terminal of the electric circuit 37. A magnesia lime carbon product electrode may be used instead of the carbon electrode, but it has been found preferable to employ the carbon electrode owing to its greater permanency which reduces the degree of attention necessary to give to the furnace during the operation of the process.

After the electrodes have been inserted in the furnace the hydrogen, hydrocarbon or other medium suitable for forming or constituting a reducing atmosphere, is admitted to the chamber 6 from the container 18 until the atmosphere within the furnace is removed and the said chamber 6 is completely filled with the said reducing atmosphere. The electric current is then turned on and the electrodes 36 and 39 are adjusted to secure the required arc.

The dolomite and carbon charge mixture is raised to the dissociation temperature and the lime combines with the carbon to form calcium carbide and the magnesia compound is reduced to magnesium in the vapor state. The magnesia vapor distills and is carried with the current of reducing atmosphere with the other volatile products of the reaction into the receptacle 21. The magnesium vapor when brought down to a temperature below 1200° centigrade condenses to a liquid or molten state and collects in the receptacle 21 and the other vapors and gases escape through the outlet 22. From time to time the molten magnesium may be trapped from the receptacle 21. The calcium carbide will fall down into the receptacle 30, and when the said receptacle is filled it may be removed after breaking the seal 32 and a similar receptacle substituted therefor.

The phenomena taking place during the reduction of the oxides of magnesium and calcium is not clearly understood at this time, but the following explanation is given as suggesting the reactions that may take place.

The charge contains magnesium and calcium oxides in intimate contact with carbon, and while in an intensely heated state, is in an atmosphere of a current of a gas. The carbon reacts with the lime and forms calcium carbide and carbon monoxide; the carbon monoxide is carried off by the current of gas and thereby removed from the sphere of action; the calcium carbide and carbon both being intimately associated with the magnesium oxid, react therewith, the calcium carbide possibly absorbing or combining with some of the carbon, thereby forming a reducing mass in which both carbide and carbon are more effective as reducing agents; the action may be catalytic, in that the carbide renders the carbon more active in its reaction with the magnesium oxide, resulting in the reduction of the latter to metallic magnesium with formation of carbon monoxide, which latter gas is immediately removed from the sphere of the reaction by the current of reducing or other gas through the receptacle 21 and out through the outlet 22. The liberated magnesium vapor is also carried along by the current of reducing gas and condensed in the receptacle 21 as above noted.

Whatever may be the nature and the order of the reactions, the effect is the liberation of magnesium as a vapor and its removal from the zone of reaction to a point where it can be condensed in the form of pure metal.

What I claim is:—

1. The process for the reduction of dolomite to magnesium and calcium carbide consisting in vaporizing the volatile components of the dolomite and bringing the vapors into association with a carbonaceous material at a high temperature and in the presence of a reducing medium and condensing the magnesium vapor.

2. The process for the reduction of dolomite to magnesium and calcium carbide consisting in vaporizing the volatile components of the dolomite and bringing the vapors into association with a carbonaceous material at a high temperature in a reducing atmosphere, then collecting the calcium carbide and condensing the magnesium vapor.

3. The process for the reduction of dolomite to magnesium and calcium carbide consisting in forming a bar or rod of a mixture of comminuted dolomite and a comminuted carbonaceous material, connecting said bar to one terminal of an electric circuit to form an electrode, connecting any suitable electrode to the other terminal of said electric circuit and then bringing the electrodes sufficiently close together to form an arc and supplying a reducing atmosphere around the said electrodes.

4. The process of obtaining metallic magnesium and calcium carbide from a charge which contains magnesium and calcium compounds, which comprises heating said charge in the presence of carbonaceous matter in an electric furnace in a current of a reducing atmosphere until reacting conditions are obtained, forming calcium carbide and metallic magnesium, and removing the metallic magnesium from the furnace.

5. The process of obtaining metllic magnesium from a charge containing a compound of magnesium and also a compound capable of forming a carbide, which comprises heating said charge to reacting conditions while subjected to the action of a reducing agent containing carbon, forming a carbide and liberating metallic magnesium, and removing the metallic magnesium from the furnace.

6. The process of obtaining metallic magnesium and calcium carbide from a charge which contains magnesium and calcium compounds, which comprises comminuting the compounds and mixing the same with carbonaceous matter to form a furnace charge, heating said furnace charge in a current of a gas until reacting conditions are obtained, forming calcium carbide and metallic magnesium, and removing the metallic magnesium from the furnace.

7. The process of obtaining metallic magnesium and calcium carbide from a charge containing magnesium and calcium compounds, which comprises comminuting said charge and mixing the same with comminuted carbonaceous matter, and briquetting and shaping said mass with the aid of a binder, baking said shaped mass, and electrically heating said mass while in contact with a stream of a gas to a reacting temperature, forming calcium carbide and metallic magnesium and removing the gaseous and vaporized products of the reaction from the presence of the reacting mass by the stream of gas.

8. The process of obtaining metallic magnesium and calcium carbide from a charge containing magnesium and calcium compounds, which comprises comminuting said charge and mixing the same with comminuted carbonaceous matter, shaping and baking said shaped mass, and subjecting said shaped mass to the heat generated by an electric current while conducting a stream of gas over and in contact with said shaped mass, reducing said magnesium and calcium compounds by the carbonaceous matter and forming calcium carbide and metallic magnesium and removing the gaseous and vaporized products from the sphere of action by the stream of gas.

9. The process of obtaining metallic magnesium and calcium carbide from a charge which contains magnesium and calcium compounds, which comprises heating said charge in an electric furnace in a current of heated hydrogen until reacting conditions are obtained, forming calcium carbide and metallic magnesium, and removing the metallic magnesium from the furnace.

10. The process of obtaining metallic magnesium and calcium carbide from a charge which contains magnesium and calcium compounds, which comprises comminuting the compounds and mixing the same with carbonaceous matter to form a furnace charge, heating said furnace charge in a current of heated hydrogen until reacting conditions are obtained, forming calcium carbide and metallic magnesium, and removing the metallic magnesium from the furnace.

11. The process of obtaining metallic magnesium and calcium carbide from a charge containing magnesium and calcium compounds, which comprises comminuting said charge and mixing the same with comminuted carbonaceous matter, and briquetting and shaping said mass with the aid of a binder, baking said shaped mass, and electrically heating said mass while in contact with a stream of heated hydrogen to a reacting temperature, forming calcium carbide and metallic magnesium and removing the gaseous and vaporized products of the reaction from the presence of the reacting mass by the stream of heated hydrogen.

12. The process of obtaining metallic magnesium and calcium carbide from a charge containing magnesium and calcium compounds, which comprises comminuting said charge and mixing the same with comminuted carbonaceous matter, shaping and baking said shaped mass, and subjecting said shaped mass to the heat generated by an electric current while conducting a stream of heated hydrogen over and in contact with said shaped mass, reducing said magnesium and calcium compounds by the carbonaceous matter and forming calcium carbide and metallic magnesium and removing the gaseous and vaporized products from the sphere of action by the stream of heated hydrogen.

13. The improved process of producing metallic magnesium and calcium carbide which consists in heating to a reacting temperature a charge of calcium and magnesium compounds with a carbonaceous reducing agent in a continuously moving hydrogen containing atmosphere with the aid of an electric current.

14. The process of obtaining substantially pure metallic magnesium and commercially pure calcium carbide which comprises mixing a charge containing comminuted limestone containing 25 to 75 per cent magnesium carbonate and less than 2 per cent of objectionable impurities with a comminuted reducing agent capable of forming a hydrocarbon binder and upon reduction a carbide, molding and baking said mixture, treating the resulting cake in an electric furnace at a reducing temperature, reducing the charge while passing a current of a hydrogen containing atmosphere to vaporize the reduced metallic magnesium and produce calcium carbide in a molten condition.

In testimony whereof I affix my signature.

WILLIAM KOEHLER.